United States Patent
Kumar (10) Patent No.: US 12,443,632 B2
(45) Date of Patent: Oct. 14, 2025

(54) METHOD AND SYSTEM FOR DISPLAYING A RESPONSE TO A NATURAL LANGUAGE QUERY

(71) Applicant: JPMorgan Chase Bank, N.A., New York, NY (US)

(72) Inventor: Sachin Kumar, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/140,873

(22) Filed: Apr. 28, 2023

(65) Prior Publication Data
US 2024/0248919 A1 Jul. 25, 2024

(30) Foreign Application Priority Data
Jan. 24, 2023 (IN) .............................. 202311004707

(51) Int. Cl.
*G06F 16/00* (2019.01)
*G06F 16/3329* (2025.01)
*G06F 16/334* (2025.01)
*G06F 16/338* (2019.01)

(52) U.S. Cl.
CPC ...... *G06F 16/3329* (2019.01); *G06F 16/3344* (2019.01); *G06F 16/338* (2019.01)

(58) Field of Classification Search
CPC . G06F 16/3329; G06F 16/3344; G06F 16/338
See application file for complete search history.

(56) References Cited

U.S. PATENT DOCUMENTS

| | | | | |
|---|---|---|---|---|
| 2018/0349473 A1* | 12/2018 | Smith | ................. | G06F 16/3329 |
| 2019/0236132 A1* | 8/2019 | Zhu | ........................ | G06N 20/00 |
| 2021/0019309 A1* | 1/2021 | Yadav | ................. | G06F 16/2428 |

* cited by examiner

*Primary Examiner* — Paul Kim
(74) *Attorney, Agent, or Firm* — Greenblum & Bernstein, P.L.C.

(57) ABSTRACT

A method and a system for displaying a response to at least one natural language query are disclosed. The method includes receiving the at least one natural language query. The method further includes analyzing, using a trained model, the at least one natural language query to identify an intent and entities associated with the at least one natural language query. The method further includes composing a database-specific query using the identified intent and entities associated with the at least one natural language query. The method includes executing the database-specific query to retrieve the response to the at least one natural language query from at least one database. The method further includes displaying, via a display, the response that is retrieved from the at least one database.

18 Claims, 5 Drawing Sheets

METHOD AND SYSTEM FOR DISPLAYING A RESPONSE TO A NATURAL LANGUAGE QUERY

CROSS-REFERENCE TO RELATED APPLICATIONS

This application claims priority benefit from Indian Application No. 202311004707, filed on Jan. 24, 2023 in the India Patent Office, which is hereby incorporated by reference in its entirety.

FIELD OF THE DISCLOSURE

This technology generally relates to methods and systems for providing a natural language query interface connected to a database, and more particularly relates to methods and systems for displaying a simplified response to a natural language query.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Business analytics requires large volumes of data that are stored in databases or data repositories. To retrieve relevant data, the query needs to be executed in a language easily understood by the database. For instance, users with technical knowledge may form Structured Query Language (SQL) statements to retrieve data for business decisions and analytics. However, non-technical users are not able to retrieve the required data for business decisions without the help of a trained technical expert who may compose database-specific queries for them. Thus, the existing solution fails to deal with the problem associated with the complexity and technical nature of raising database-specific queries.

Hence, in view of these and other existing limitations, there arises an imperative need to provide an efficient solution to overcome the above-mentioned limitations and to provide a method and a system for displaying a response to at least one natural language query to the users even when the users do not have sufficient technical knowledge of a specific data source.

SUMMARY

The present disclosure, through one or more of its various aspects, embodiments, and/or specific features or sub-components, provides, inter alia, various systems, servers, devices, methods, media, programs, and platforms for displaying a response to at least one natural language query.

According to an aspect of the present disclosure, a method for displaying a response to at least one natural language query is disclosed. The method is implemented by at least one processor. The method includes receiving, by the at least one processor via a communication interface, the at least one natural language query. Next, the method includes analyzing, by the at least one processor using a trained model, the at least one natural language query to identify an intent and entities associated with the at least one natural language query. Next, the method includes composing, by the at least one processor, a database-specific query using the identified intent and entities associated with the at least one natural language query. Next, the method includes executing, by the at least one processor, the database-specific query to retrieve the response to the at least one natural language query from at least one database. Thereafter, the method includes displaying, by the at least one processor via a display, the response retrieved from the at least one database.

In accordance with an exemplary embodiment, the at least one natural language query includes at least one query received in a natural language using at least one querying command type that comprises from one among an audio-based command and a text-based command.

In accordance with an exemplary embodiment, the response that is retrieved from the at least one database is displayed in a form of a visual representation.

In accordance with an exemplary embodiment, the trained model includes at least one from among an artificial intelligence based model and a machine learning based natural language processing model.

In accordance with an exemplary embodiment, the at least one database includes a plurality of responses associated with a plurality of queries stored in a language associated with the at least one database.

In accordance with an exemplary embodiment, the method further includes automatically predicting, by the at least one processor using the trained model, the at least one natural language query using at least one from among an auto-complete feature, an auto-correction feature, and a query recommendation feature.

According to another aspect of the present disclosure, a computing device configured to implement the execution of a method for displaying a response to at least one natural language query is disclosed. The computing device comprises: a processor; a memory; and a communication interface coupled to each of the processor and the memory. The processor may be configured to receive, via a communication interface, the at least one natural language query. Next, the processor may be configured to analyze, using a trained model, the at least one natural language query to identify an intent and entities associated with the at least one natural language query. Next, the processor may be configured to compose a database-specific query using the identified intent and entities associated with the at least one natural language query. Next, the processor may be configured to execute the database-specific query to retrieve the response to the at least one natural language query from at least one database. Thereafter, the processor may be configured to display, via a display, the response that is retrieved from the at least one database.

In accordance with an exemplary embodiment, the at least one natural language query includes at least one query received in a natural language using at least one querying command type that comprises from one among an audio-based command and a text-based command.

In accordance with an exemplary embodiment, the processor may be configured to display the response, that is retrieved from the at least one database, in a form of a visual representation.

In accordance with an exemplary embodiment, the trained model includes at least one from among an artificial intelligence based model and a machine learning based natural language processing model.

In accordance with an exemplary embodiment, the at least one database includes a plurality of responses associated with a plurality of queries stored in a language associated with the at least one database.

In accordance with an exemplary embodiment, the processor may be configured to automatically predict, using the trained model, the at least one natural language query using at least one from among an auto-complete feature, an auto-correction feature, and a query recommendation feature.

According to yet another aspect of the present disclosure, a non-transitory computer readable storage medium storing instruction for displaying a response to at least one natural language query is disclosed. The instructions include executable code which, when executed by a processor, may cause the processor to receive at least one natural language query; analyze, using a trained model, the at least one natural language query to identify an intent and entities associated with the at least one natural language query; compose a database-specific query using the identified intent and entities associated with the at least one natural language query; execute the database-specific query to retrieve the response to the at least one natural language query from at least one database; and display the response that is retrieved from the at least one database.

In accordance with an exemplary embodiment, the at least one natural language query includes at least one query received in a natural language using at least one querying command type that comprises from one among an audio-based command and a text-based command.

In accordance with an exemplary embodiment, the executable code, when executed further causes the processor to display the response that is retrieved from the at least one database in a form of a visual representation.

In accordance with an exemplary embodiment, the trained model includes at least one from among an artificial intelligence based model and a machine learning based natural language processing model.

In accordance with an exemplary embodiment, the at least one database includes a plurality of responses associated with a plurality of queries stored in a language associated with the at least one database.

In accordance with an exemplary embodiment, the executable code, when executed further causes the processor to automatically predict, using the trained model, the at least one natural language query using at least one from among an auto-complete feature, an auto-correction feature, and a query recommendation feature.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Exemplary embodiments now will be described with reference to the accompanying drawings. The example embodiments may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent, however, that the invention may be practiced without these specific details and features.

Through one or more of its various aspects, embodiments, and/or specific features or sub-components of the present disclosure, are intended to bring out one or more of the advantages as specifically described above and noted below.

The examples may also be embodied as one or more non-transitory computer-readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome problems associated with complexity and technical nature of database-specific queries, the present disclosure provides a method and a system for receiving at least one query in a natural language and displaying a response to the at least query using an artificial intelligence (AI) and machine learning (ML) based natural language processing (NLP) model. The system first receives and reads at least one natural language query. In an example, the at least one natural language query may be received in form of a user utterance where a speech-to-text converter is used to convert the user query to a text-based query. Additionally, the user may also input a query directly in form of a text as a natural language query. Next, the system is configured to analyze the at least one natural language query to identify an intent and entities associated with the at least one natural language query. Query intent identification helps to understand a user's intent toward search results. A process of intent identification helps in ranking the search results and accurately triggers a corresponding vertical search. Entity recognition involves the detection of key information in the text and classification into different predetermined categories. In an example, for a query "Show me yesterday's election news", the intent of the query is associated with the terms "show", "news" and the entities include "yesterday" in a category of "time", and "election" as a category of "Politics". In the subsequent step, a database-specific query is composed using the identified intent and entities. In an example, a structured query is data source specific and may be in the form of GraphQL query, REST API JSON Payload, SQL, and the like. The above feature makes the system or device flexible, and it may be customized as per at least one database or at least one data repository. In a non-limiting embodiment, the database comprises a plurality of responses associated with a plurality of queries stored in a language associated with the at least one database. Thereafter, the system executes the database-specific query to retrieve a response to the at least one natural language query from the at least one database. The system displays the response that is retrieved from the at least one database in form of a visual representation. The visual representation of the response retrieved from the at least one database includes but is not limited to a tabular and a graphical representation. In an example, the tabular and the graphical representation includes Bar Graph, Column Chart, Line Graph, Dual Axis Chart, Area Chart, Stacked Bar Graph, Mekko (or Marimekko) Chart, Pie Chart, Scatter Plot Chart, Bubble Chart, Waterfall Chart, Funnel Chart, Bullet Chart, Heat Map, rows and columns matrix. In another embodiment of the present disclosure, the response that is retrieved from the at least one database may be displayed in any appropriate form such as audio representation, a video representation, an audio-video representation, and the like.

In a non-limiting embodiment of the present disclosure, the system automatically predicts the at least one natural language query received using at least one from among an auto-complete feature, an auto-correction feature, and a query recommendation feature. The query recommendation feature is implemented using a machine learning model which uses user inputs and behavior as training data. In an example, the system displays a response to the at least one natural language query that allow a non-technical user to perform business analytics on data stored in the data repository. Therefore, the present disclosure aids in dealing with database-specific queries without a need to learn database-specific query language. Further, the implementation of features of the present disclosure results in achieving better efficiency owing to various factors as has been explained herein below and may become evident to a person skilled in the art, where the factors include but are not limited to displaying responses to the at least one natural language query, recommendation system to autocomplete and autocorrect queries, quickly retrieving response to the at least one natural language query and the like.

Figure 1:
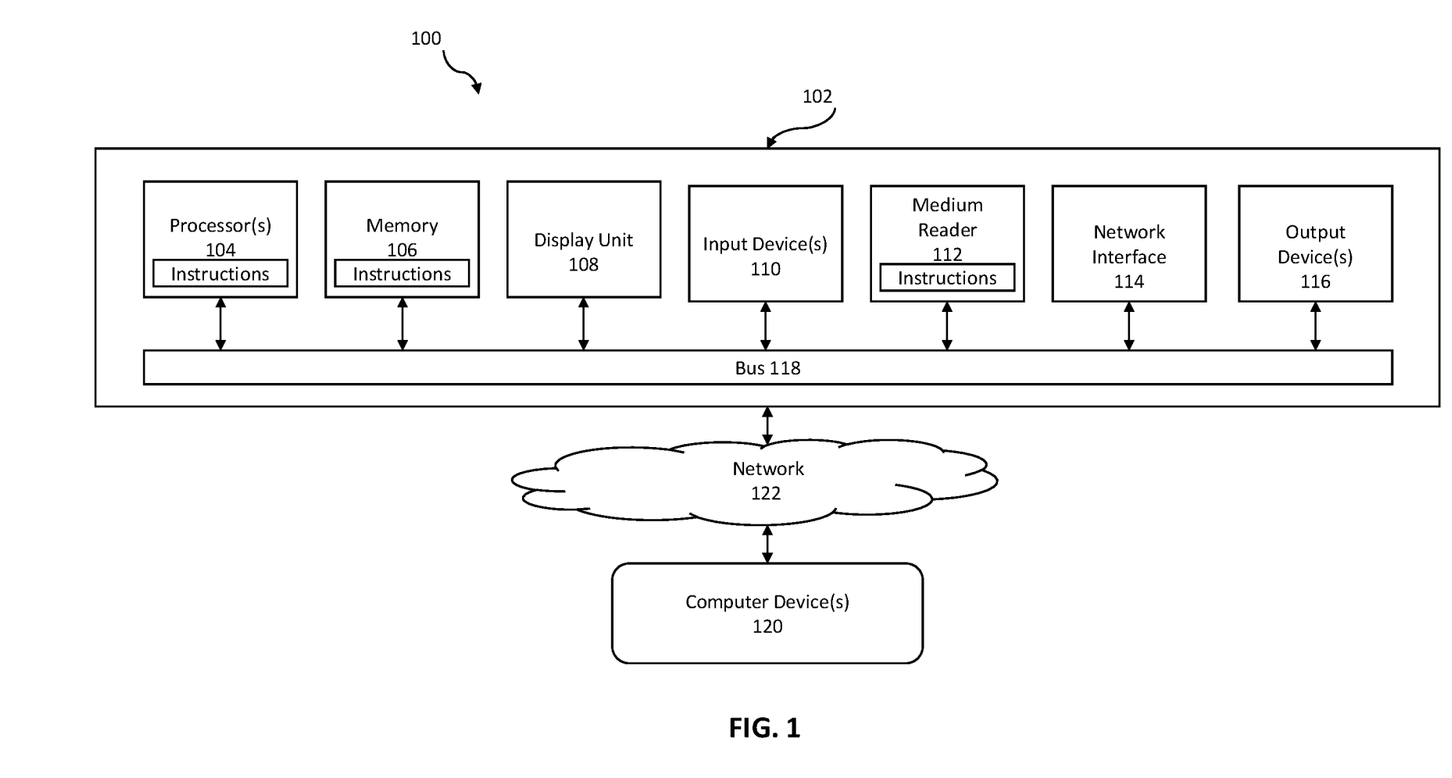
FIG. 1 illustrates an exemplary computer system for displaying a response to at least one natural language query in accordance with an exemplary embodiment.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, computer system 102 may include or be included within, any one or more computers, servers, systems, communication networks, or cloud-based environment. Even further, the instructions may be operative in a such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer function.

As used herein, a "natural language query" includes a query received in a natural language using at least one querying command type that comprises one among an audio-based command and a text-based command. The query may be received from a plurality of sources including but not limited to a user, a member of the production support team, an automated query raising platform, and the like.

As used herein, a "trained model" includes an artificial intelligence based model and/or a machine learning based natural language processing model.

As used herein, entities are associated with key information in the query and classification of the key information into predefined categories. The non-limiting identified categories of entities in Natural Language Processing are person, organization, place (or location), date (or time), expression, numeric measurement (such as percent, weight, money), and the like.

As used herein, a "database" includes storing of a plurality of responses associated with a plurality of queries in a language associated with at least one database.

As illustrated in FIG. 1, computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, and unsecured and/or unencrypted. As regards the present disclosure, the computer memory 106 may comprise any combination of memories or single storage.

The computer system 102 may further include a Display Unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, computer system 102 may include any additional devices, components, parts, peripherals, hardware, software, or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for displaying the response to at least one natural language query.

Figure 2:
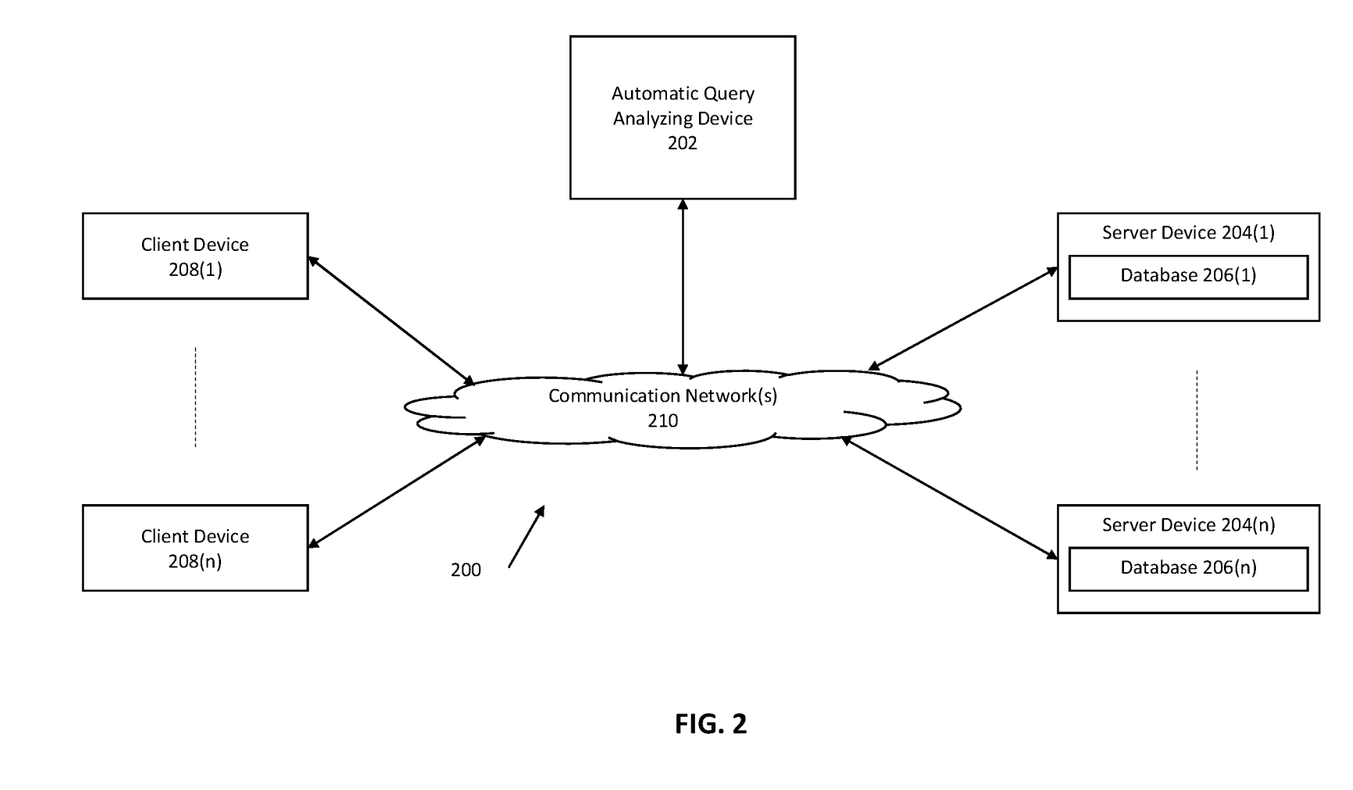
FIG. 2 illustrates an exemplary diagram of a network environment for displaying a response to at least one natural language query in accordance with an exemplary embodiment.

Referring to FIG. 2, a schematic of an exemplary network environment 200 for implementing a method for displaying a response to at least one natural language query using a trained model is illustrated. In an exemplary embodiment, the method is executable on any networked computer platform, such as, for example, a personal computer (PC).

The method for displaying the response to the at least one natural language query may be implemented by an Automatic Query Analyzing (AQA) device 202. The AQA device 202 may be the same or similar to the computer system 102 as described with respect to FIG. 1. The AQA device 202 may store one or more applications that can include executable instructions that, when executed by the AQA device 202, cause the AQA device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s), that may be managed in a cloud-based computing environment. Also, the application(s), and even the AQA device 202 itself, may be located in the virtual server(s) running in a cloud-based computing environment rather than being tied to one or more specific physical network computing devices. Also, the application(s) may be running in one or more virtual machines (VMs) executing on the AQA device 202. Additionally, in one or more embodiments of this technology, virtual machine(s) running on the AQA device 202 may be managed or supervised by a hypervisor.

In the network environment 200 of FIG. 2, the AQA device 202 is coupled to a plurality of server devices 204(1)-204(n) that hosts a plurality of databases or repositories 206(1)-206(n), and also to a plurality of client devices 208(1)-208(n) via a communication network(s) 210. A communication interface of the AQA device 202, such as the network interface 114 of the computer system 102 of FIG. 1, operatively couples and communicates between the AQA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AQA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and AQA device 202 that efficiently implement a method for displaying the response to the at least one natural language query.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The AQA device 202 may be a standalone device or integrated with one or more other devices or apparatuses, such as one or more of the server devices 204(1)-204(n), for example. In one particular example, the AQA device 202 may include or be hosted by one of the server devices 204(1)-204(n), and other arrangements are also possible. Moreover, one or more of the devices of the AQA device 202 may be in the same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the AQA device 202 via the communication network(s) 210 according to Hypertext Transfer Protocol (HTTP) based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases or repositories 206(1)-206(n) that are configured to store data that relates to business analytics, responses to the at least one natural language query, and machine learning models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) is not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AQA device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the AQA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AQA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AQA device 202, the server devices 204(1)-204(n), or the client devices 208(1)-208(n), for example, may be configured to operate as virtual instances on the same physical machine. In other words, one or more of the AQA device 202, the server devices 204(1)-204(n), or the client devices 208(1)-208(n) may operate on the same physical device rather than as separate devices communicating through a communication network(s) 210. Additionally, there may be more or fewer AQA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on a computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
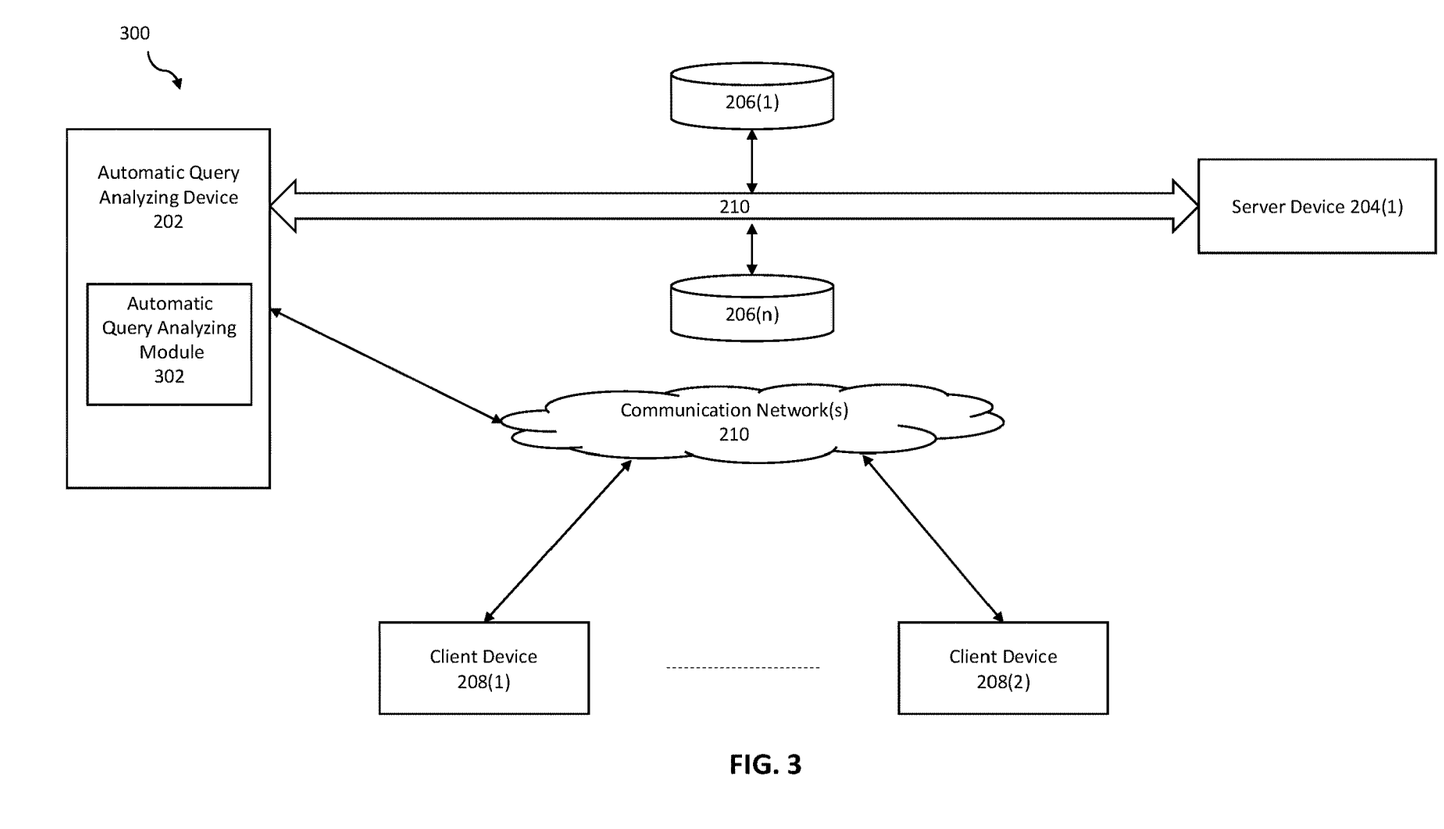
FIG. 3 illustrates an exemplary system for implementing a method for displaying a response to at least one natural language query, in accordance with an exemplary embodiment.

FIG. 3 illustrates an exemplary system for implementing a method for displaying a response to at least one natural language query, in accordance with an exemplary embodiment. As illustrated in FIG. 3, according to exemplary embodiments, the system 300 may comprise an AQA device 202 including an Automatic Query Analyzing (AQA) module 302 that may be connected to a server device 204(1) and one or more repository from the repositories 206(1) . . . 206(n) via a communication network 210, but the disclosure is not limited thereto.

The AQA device 202 is described and shown in FIG. 3 as including the AQA module 302, although it may include other rules, policies, modules, databases, or applications, for example. As will be described below, the AQA module 302 is configured to implement a method for displaying the response to the at least one natural language query in business analytics using at least one trained model.

An exemplary process 300 for implementing a mechanism for the at least one natural language query in business analytics using the at least one trained model by utilizing the network environment of FIG. 2 is shown as being executed in FIG. 3. Specifically, a first client device 208(1) and a second client device 208(2) are illustrated as being in communication with the AQA device 202. In this regard, the first client device 208(1) and the second client device 208(2) may be "clients" of the AQA device 202 and are described herein as such. Nevertheless, it is to be known and understood that the first client device 208(1) and/or the second client device 208(2) need not necessarily be "clients" of the AQA device 202, or any entity described in association therewith herein. Any additional or alternative relationship may exist between either or both of the first client device 208(1) and the second client device 208(2) and the AQA device 202, or no relationship may exist.

Further, the AQA device 202 is illustrated as being able to access the one or more repositories 206(1) . . . 206(n). The AQA module 302 may be configured to access these repositories/databases for implementing the method for displaying the response to the at least one natural language query in business analytics.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the AQA device 202 via broadband or a cellular communication. Of course, these embodiments are merely exemplary and are not limiting or exhaustive.

Figure 4:
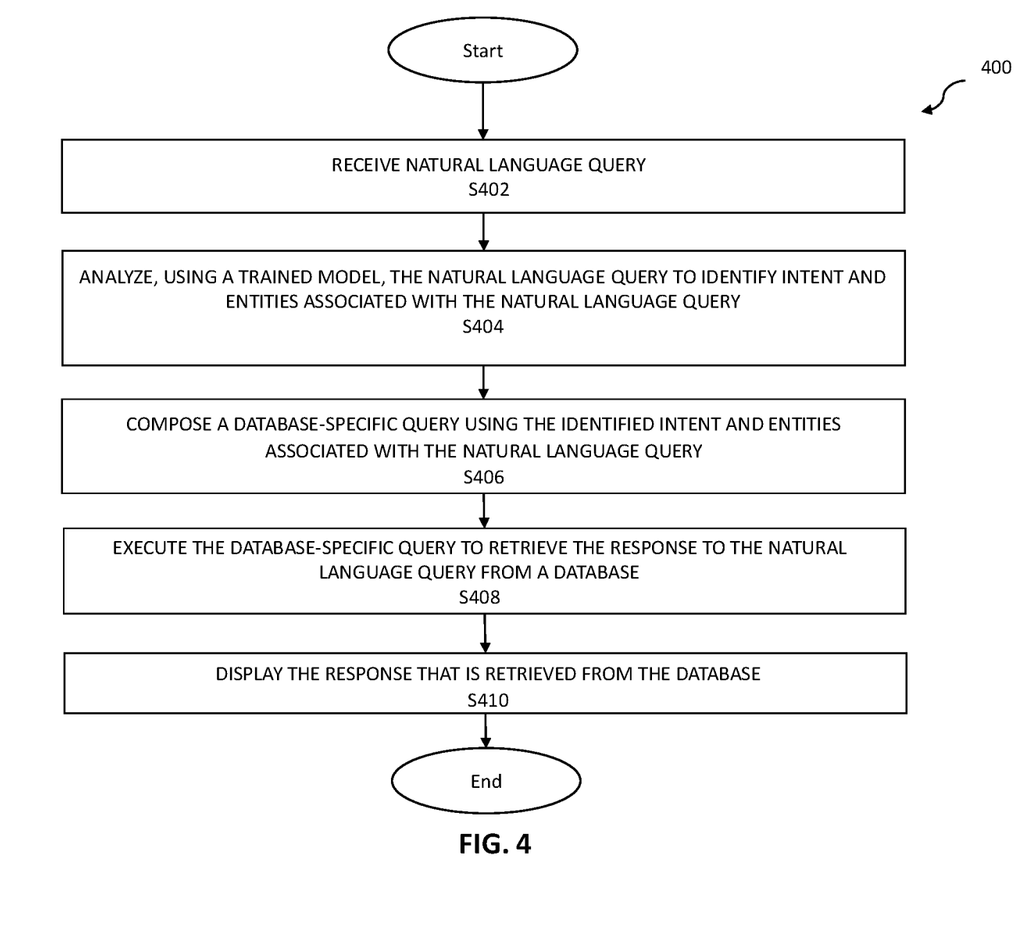
FIG. 4 illustrates an exemplary method flow diagram for displaying a response to at least one natural language query, in accordance with an exemplary embodiment.

Referring to FIG. 4, an exemplary method 400 is shown for displaying a response to at least one natural language query, in accordance with an exemplary embodiment of the present disclosure. As shown in FIG. 4, the method begins at step S402. At step S402, the method includes receiving, by at least one processor 104 via a communication interface, the at least one natural language query. The at least one natural language query may be received using at least one querying command type that comprises from among an audio-based command and a text command. In a non-limiting example, the at least one natural language query may be received from at least one of a plurality of sources. The plurality of sources includes but is not limited to a user, a query raising system, a third-party platform. In an example, the user may be a member of the production support team who wants to raise the query in the natural language. In a non-limiting embodiment, the at least one natural language query is received either in a speech format or in a text format. A speech-to-text converter may be used to convert a speech format query to a text format query. Further, the at least one natural language query includes at least one query received in the natural language. In an embodiment, the method includes automatically predicting, by the at least one processor 104 using a trained model, the at least one natural language query using at least one from among an auto-complete feature, an auto-correction feature, and a query recommendation feature. In an example, if the query received in the natural language is not complete, then the query recommendation feature, using an AI and a ML based NLP trained model, may automatically recommend key features or at least one entity to be added to the query to complete the query. In a non-limiting embodiment of the present disclosure, intent may correspond to a behavior of the user as assessed by the trained model based on queries received from the user in the past. The trained model is further capable of unsupervised learning and is trained to predict and recommend to the user the entities to be added to the query based on the queries received in the past. In a non-limiting embodiment, the present disclosure is capable of predicting the query. For instance, when the user initiates a query that includes keywords X and Y, the trained model may automatically suggest to the user relevant keyword Z based on an experience of the trained model with the queries received in the past. In another non-limiting embodiment, if the user initiates a query for a comparison of Euro cash weighted yield spread of two accounts say X and Y for a present date then the system automatically prompts and recommends to the user a query for the comparison of Euro cash weighted yield spread of the accounts X and Y for a corresponding day of a last week. This prediction is made by the trained model based on the behavior of the user towards the queries in the past and the nature of the queries received in the past.

At step S404, the method includes analyzing, by the at least one processor 104 using the trained model, the at least one natural language query to identify an intent and entities associated with the at least one natural language query. In an exemplary embodiment, the ML may include supervised learning algorithms such as, for example, k-medoids analysis, regression analysis, decision tree analysis, random forest analysis, k-nearest neighbors' analysis, logistic regression analysis, K-fold cross-validation analysis, balanced class weight analysis, and the like. The trained model is used to identify the intent and entities in the at least one natural language query based on a training on a past query data. In a non-limiting embodiment, the trained model includes at least one from among the AI based model, and the ML based NLP model. The intent helps in ranking results of the query. The entities identified are key information in a text and are classified into different categories based on a data stored in a data repository. In a non-limiting embodiment, the entities identified may include action, account, instrument, analytics, data and the like.

At step S406, the method includes composing, by the at least one processor 104, a database-specific query using the identified intent and entities associated with the at least one natural language query. In a non-limiting embodiment, the database-specific query is a query composed in a machine language understood and used by the at least one processor 104 to retrieve the response to the at least one natural language query from at least one database. In a non-limiting embodiment, the database-specific query may be in the format of GraphQL query, REST API JSON Payload, SQL query, and the like.

At step S408, the method includes executing, by the at least one processor 104, the database-specific query to retrieve the response of the at least one natural language query from the at least one database. The database-specific query is executed to retrieve the response to the at least one natural language query from the at least one database or a data repository. In a non-limiting embodiment, additional analytics may be performed by the system to generate an intended result of the at least one natural language query along with parameters of the at least one natural language query. Further, in a non-limiting embodiment, the method includes converting, by at least the processor 104, the response that is retrieved from the at least one database into the natural language.

At step S410, the method includes displaying, by the at least one processor 104 via a display, the response that is retrieved from the at least one database in the natural language. In an example, the response retrieved from the at least one database may be displayed to the user in an event the at least one natural language query is received from the user. The response retrieved as a result of the at least one natural language query is displayed in the form of a visual representation on a user interface. The visual representation of the retrieved response includes but is not limited to displaying a tabular or graphical representation of the response that is retrieved from the at least one database. In an example, the visual representation includes tables, graphs, charts, rows and columns matrix, and the like.

Figure 5:
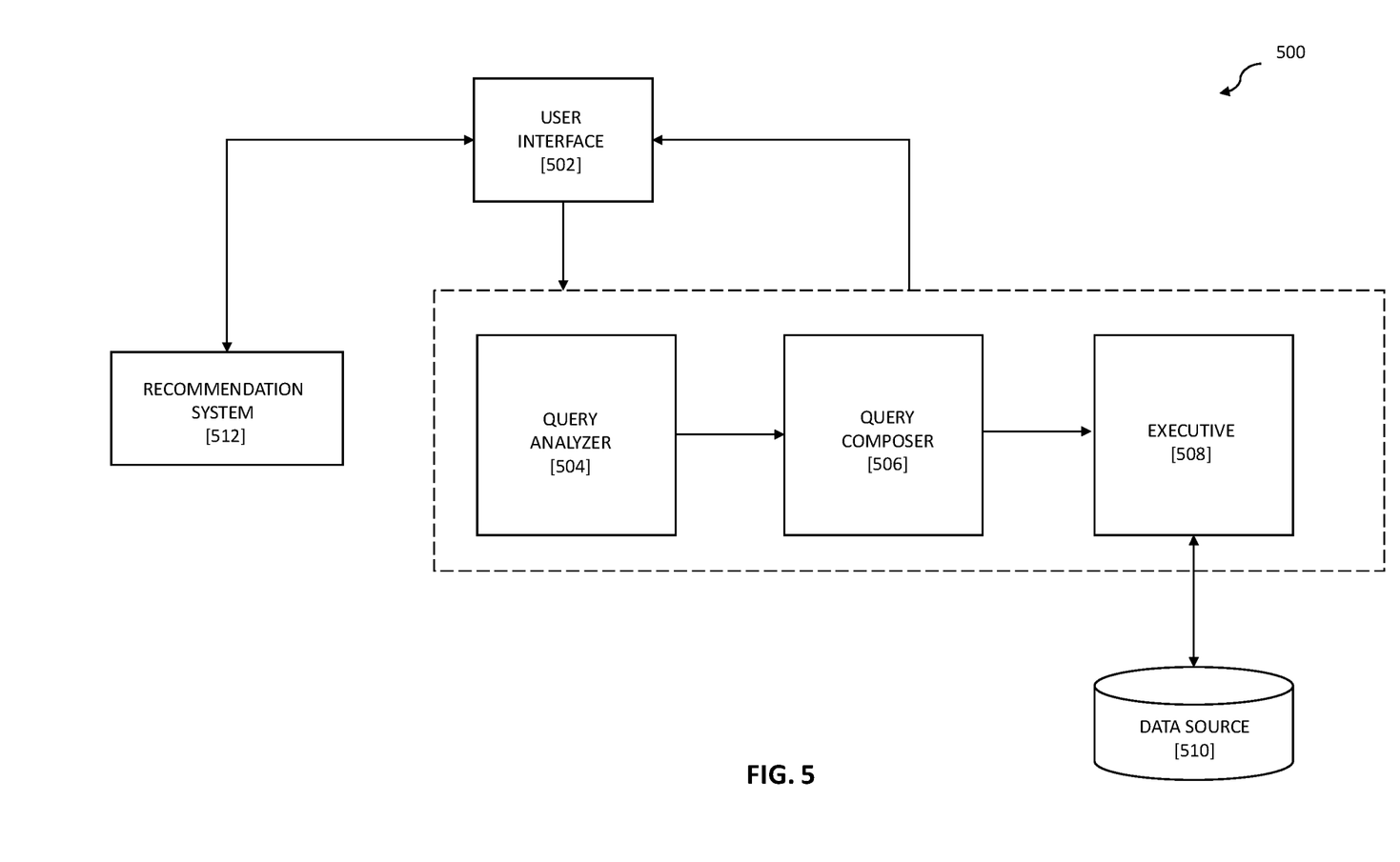
FIG. 5 illustrates a process flow diagram for implementing a method for displaying a response to at least one natural language query, in accordance with an exemplary embodiment.

FIG. 5 illustrates a process flow diagram for displaying a response to at least one natural language query, in accordance with the exemplary embodiment of the present disclosure. As illustrated in FIG. 5, the process flow 500 begins by receiving at least one natural language query through a user interface 502. In a non-limiting embodiment, the at least one natural language query may be received in the form of a text input. The at least one natural language query is then sent to a Query Analyzer 504. The Query Analyzer relies upon an AI and an ML based NLP Model. The ML based NLP model is trained to identify intent and entities in the at least one natural language query. In an example, a query "Compare today's Euro cash weighted yield spread from yesterday for 4022222" is analyzed by the Query Analyzer to identify and extract information that relates to intent, account, instrument, analytics, and date. In the example, the intent of the query is related to the comparison of the yield spread, and the outcome is expected in the form of analytics or visual representation. The entities associated with the query in the above example include "today", "yesterday", "Euro" and "4022222", where "today" and "yesterday" are associated with a category of time, "Euro" is related to a category of currency and "4022222" is related to a category of Account. Thus, after identifying the intent and entities in the at least one natural language query through the ML based trained model, the intent and entities are sent to a Query Composer. The Query Composer 506 forms a data source-specific structured query. The system and method of the present disclosure is customized to work in tandem with various types of data sources or data repositories. The structured data source-specific query may be in the format of a GraphQL query, a REST API JSON Payload, a SQL query, and the like. Next, the process flow moves to the step of executing the data source-specific structured query. The executive 508 connects to at least one data source 510 and runs the data source-specific structured query. The executive 508 retrieves the response to the data source-specific structured query from the at least one data source 510. The response to the data source-specific structured query is sent to the user interface. The user interface 502 displays the response as a result of the data source-specific structured query via a display. The result is displayed in a form of a visual representation. The visual representation of the response includes but is not limited to a tabular and graphical representation. In an example, the visual representation includes tables, graphs, charts, rows and columns matrix, and the like. The process flow uses a Recommendation System 512, also referred as the at least one processor 104, which is configured to automatically predict the at least one natural language query using at least one from among an auto-complete feature, an auto-correction feature, and a query recommendation feature. In an embodiment of the present disclosure, the system is configured to store and update data associated with the at least one natural language query in real-time for future reference such as recommendation of queries. In an example, the data includes but is not limited to at least one natural language query recommended in the past, at least one new natural language query, at least one natural language query and a corresponding resolution, frequently received at least one natural language query and the like.

In an exemplary embodiment, a user may want to quickly check an analytics model for an account. The user is a non-technical user and cannot form a database-specific query to check the analytics. The user may simply use the method and system of the exemplary embodiments described herein to quickly check the analytics using the trained ML based NLP model. The trained ML based NLP model first analyzes and thereafter composes data source-specific queries to quickly check the analytics for the account.

Accordingly, with this technology, an optimized process for displaying the response to the at least one natural language query is disclosed. As evident from the above disclosure, the present solution provides significant technical advancement over the exciting solutions by displaying the response to the at least one natural language query by using the trained model. Further, retrieving the required response from the database using the above-mentioned features of the present disclosure is easier and faster when compared with existing platforms that load accounts completely or run long reports. Therefore, as disclosed in the present disclosure, the described embodiments are helpful in simplifying the process of querying a database through natural language queries.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials, and embodiments, the present disclosure is not intended to be limited to the particulars disclosed; rather the present disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/ "computer-readable storage medium" shall also include any storage medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

According to an aspect of the present disclosure, a non-transitory computer-readable storage medium storing instructions for displaying a response to at least one natural language query is disclosed. The instructions include executable code which, when executed by a processor, may cause the processor to receive, via a communication interface, the at least one natural language query; analyze, using a trained model, the at least one natural language query to identify an intent and entities associated with the at least one natural language query; compose a database-specific query using the identified intent and entities associated with the at least one natural language query; execute the database specific query to retrieve the response to the at least one natural language query from at least one database; and display, via a display, the response that is retrieved from the at least one database. The at least one natural language query includes at least one query received in a natural language. The at least one natural language query may be received using at least one querying command type that comprises one from among an audio-based command and a text-based command.

The processor may display the response to the at least one natural language query, that is retrieved from the at least one database, in form of a visual representation. The trained model includes at least one from among an AI based model, and an ML based NLP model. The at least one database includes a plurality of responses associated with a plurality of queries stored in a language associated with the at least one database. The processor may automatically predict the at least one natural language query using at least one from among an auto-complete feature, an auto-correction feature, and a query recommendation feature.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for displaying a response to at least one natural language query, the method being implemented by at least one processor, the method comprising:
   receiving, by the at least one processor via a communication interface, at least one first natural language query from a user;
   identifying, by the at least one processor via a query analyzer, an intent of the user regarding intended search results of the at least one first natural language query, wherein the query analyzer uses an artificial-intelligence-based model and a machine-learning-based, natural-language processing model that is trained on past queries for identifying intents and entities of past natural language queries;
   identifying, by the at least one processor via the query analyzer, an entity associated with the at least one first natural language query, wherein the entity includes at least one keyword associated with a context of the at least one first natural language query;
   automatically correcting, by the at least one processor using the artificial-intelligence-based model and the machine-learning-based, natural-language processing model, the at least one first natural language query to generate at least one second natural language query;

classifying, by the at least one processor, the entity into predetermined categories based on data stored in at least one database;

transmitting, by the at least one processor, the identified intent and entities associated with the at least one natural language query to a query composer;

automatically generating, by the at least one processor via the query composer, a database-specific query, based on the intent, the entities, and the at least one second natural language query;

transmitting, by the at least one processor, the database-specific query to an executive module;

automatically executing, by the at least one processor via the executive module, the database-specific query, wherein the executive module connects to the at least one database and runs the database-specific query in the at least one database to generate a plurality of results;

ranking, by the at least one processor and based on the identified intent, the plurality of results;

retrieving, by the at least one processor and based on the ranking of the plurality of results, a response to the database-specific query from the at least one database;

converting, by the at least one processor, the response to the database-specific query into a natural language response; and displaying, by the at least one processor via a display, the natural language response.

2. The method as claimed in claim 1, wherein the at least one first natural language query comprises at least one query received in a natural language using at least one querying command type that comprises an audio-based command, and wherein the audio-based command is converted to a text format via a speech-to-text converter.

3. The method as claimed in claim 1, wherein the response that is retrieved from the at least one database is displayed in a form of a visual representation.

4. The method as claimed in claim 1, wherein the at least one database comprises a plurality of responses associated with a plurality of queries stored in a language associated with the at least one database.

5. The method as claimed in claim 1, further comprising automatically predicting, by the at least one processor using the trained model, the at least one second natural language query using an auto-correction feature.

6. A computing device configured to implement an execution of a method for displaying a response to at least one natural language query, the computing device comprising:
a processor;
a memory; and
a communication interface coupled to each of the processor and the memory,
wherein the processor is configured to:
receive, via the communication interface, at least one first natural language query from a user;
identify, via a query analyzer, an intent of the user regarding intended search results of the at least one first natural language query, wherein the query analyzer uses an artificial-intelligence-based model and a machine-learning-based, natural-language processing model that is trained on past queries for identifying intents and entities of past natural language queries;
identify, via the query analyzer, an entity associated with the at least one first natural language query, wherein the entity includes at least one keyword associated with a context of the at least one first natural language query;

automatically correct, via the artificial-intelligence-based model and the machine-learning-based, natural-language processing model, the at least one first natural language query to generate at least one second natural language query;
classify the entity into predetermined categories based on data stored in at least one database;
transmit the identified intent and entities associated with the at least one natural language query to a query composer;
automatically generate, via the query composer, a database-specific query, based on the intent, the entities, and the at least one second natural language query;
transmit the database-specific query to an executive module;
automatically execute, via the executive module, the database-specific query, wherein the executive module connects to the at least one database and runs the database-specific query in the at least one database to generate a plurality of results;
rank, based on the identified intent, the plurality of results;
retrieve, based on the ranking of the plurality of results, a response to the database-specific query from the at least one database;
convert the response to the database-specific query into a natural language response; and
display the natural language response.

7. The computing device as claimed in claim 6, wherein the at least one first natural language query comprises at least one query received in a natural language using at least one querying command type that comprises an audio-based command, and wherein the audio-based command is converted to a text format via a speech-to-text converter.

8. The computing device as claimed in claim 6, wherein the processor is further configured to display the response that is retrieved from the at least one database in a form of a visual representation.

9. The computing device as claimed in claim 6, wherein the at least one database comprises a plurality of responses associated with a plurality of queries stored in a language associated with the at least one database.

10. The computing device as claimed in claim 6, wherein the processor is further configured to automatically predict, using the trained model, the at least one second natural language query using an auto-correction feature.

11. A non-transitory computer readable storage medium storing instructions for displaying a response to at least one natural language query, the instructions comprising executable code which, when executed by a processor, causes the processor to:
receive the at least one first natural language query from a user;
identify, via a query analyzer, an intent of the user regarding intended search results of the at least one first natural language query, wherein the query analyzer uses an artificial-intelligence-based model and a machine-learning-based, natural-language processing model that is trained on past queries for identifying intents and entities of past natural language queries;
identify, via the query analyzer, an entity associated with the at least one first natural language query, wherein the entity includes at least one keyword associated with a context of the at least one first natural language query;
automatically correct, via the artificial-intelligence-based model and the machine-learning-based, natural-language processing model, the at least one first natural language query to generate at least one second natural language query;
classify the entity into predetermined categories based on data stored in at least one database;
transmit the identified intent and entities associated with the at least one natural language query to a query composer;
automatically generate, via the query composer, a database-specific query, based on the intent, the entities, and the at least one second natural language query;
transmit the database-specific query to an executive module;
automatically execute, via the executive module, the database-specific query, wherein the executive module connects to the at least one database and runs the database-specific query in the at least one database to generate a plurality of results;
rank, based on the identified intent, the plurality of results;
retrieve, based on the ranking of the plurality of results, a response to the database-specific query from the at least one database;
convert the response to the database-specific query into a natural language response; and
display the natural language response.

12. The storage medium as claimed in claim 11, wherein the at least one first natural language query comprises at least one query received in a natural language using at least one querying command type that comprises an audio-based command, and wherein the audio-based command is converted to a text format via a speech-to-text converter.

13. The storage medium as claimed in claim 11, wherein when executed by the processor, the executable code further causes the processor to display the response that is retrieved from the at least one database in a form of a visual representation.

14. The storage medium as claimed in claim 11, wherein the at least one database comprises a plurality of responses associated with a plurality of queries stored in a language associated with the at least one database.

15. The storage medium as claimed in claim 11, wherein when executed by the processor, the executable code further causes the processor to automatically predict, using the trained model, the at least one second natural language query using an auto-correction feature.

16. The method as claimed in claim 1, wherein a plurality of responses to the at least one second natural language query are retrieved from the at least one database, and wherein the plurality of responses are ranked based on the identified intent.

17. The computing device as claimed in claim 6, wherein the processor is further configured to retrieve a plurality of responses to the at least one second natural language query from the at least one database, and rank the plurality of responses based on the identified intent.

18. The storage medium as claimed in claim 11, wherein when executed by the processor, the executable code further causes the processor to retrieve a plurality of responses to the at least one second natural language query from the at least one database, and rank the plurality of responses based on the identified intent.

* * * * *